United States Patent [19]

Heyworth

[11] Patent Number: 4,693,643
[45] Date of Patent: Sep. 15, 1987

[54] PLASTIC PIPE PLANING DEVICE

[75] Inventor: Malcolm I. Heyworth, Charlotte, N.C.

[73] Assignee: E&A Heyworth Enterprises, Inc., Charlotte, N.C.

[21] Appl. No.: 865,262

[22] Filed: May 20, 1986

[51] Int. Cl.⁴ .......................... B23B 3/22; B23B 41/00
[52] U.S. Cl. ......................................... 408/82; 408/201
[58] Field of Search ...................... 408/75, 80, 82, 91, 408/225, 211, 200, 201; 409/143, 303; 82/1.2, 1.4, 1.5, 4 C; 144/205

[56] References Cited

U.S. PATENT DOCUMENTS

| 3,752,593 | 8/1973 | Fitzgerald et al. | 408/1 R |
| 3,872,748 | 3/1975 | Bjalme et al. | 82/4 C |
| 3,999,452 | 12/1976 | Larsen | 408/80 |
| 4,466,185 | 8/1984 | Montiero | 30/103 |
| 4,483,222 | 11/1984 | Davis | 82/4 C |
| 4,483,522 | 11/1984 | Nall et al. | 82/4 C |
| 4,493,232 | 1/1985 | Nall | 82/4 C |

FOREIGN PATENT DOCUMENTS 152659 8/1985 European Pat. Off. .............. 82/4 C 869975 10/1981 U.S.S.R. ................................ 82/4 C

OTHER PUBLICATIONS

Jones Manufacturing Co. Inc, "Pipe Hog", no date reference to Patent No. 3752593 on pp. 1 and 2.

Primary Examiner—Z. R. Bilinsky
Attorney, Agent, or Firm—Bell, Seltzer, Park & Gibson

[57] ABSTRACT

This planing device is operable for progressively planing or cutting the end of a plastic pipe to the desired length, or for reaming out a piece of plastic pipe fixed in a plastic pipe fitting in such a manner that the plastic pipe fitting can be reused. The pipe planing device is portable and is rotated by an electric drill or the like and includes a cylindrical pilot removably supported on radially spaced-apart spider-like cutter arms having cutter blades attached to their outer ends and extending outwardly beyond the cylindrical pilot a distance which is equal to the thickness of the plastic pipe to be cut or reamed. The outer circumference of the cylindrical pilot is dimensioned to provide a snug rotatable fit within the end of the plastic pipe to be planed and operates to center the planing device along the longitudinal axis of the plastic pipe.

9 Claims, 8 Drawing Figures

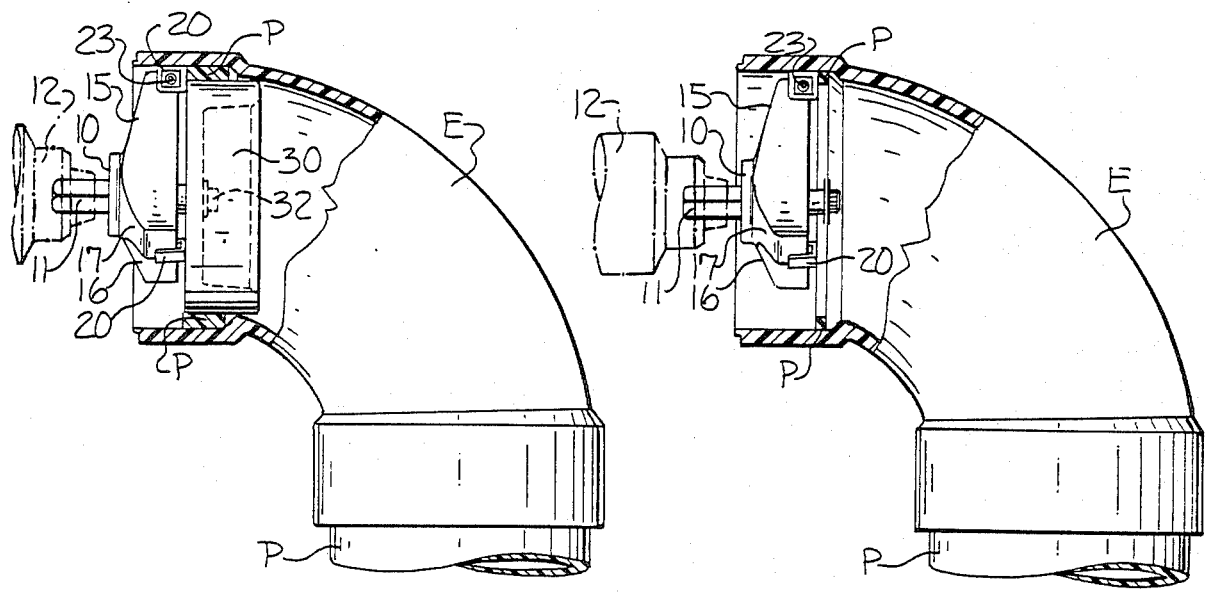
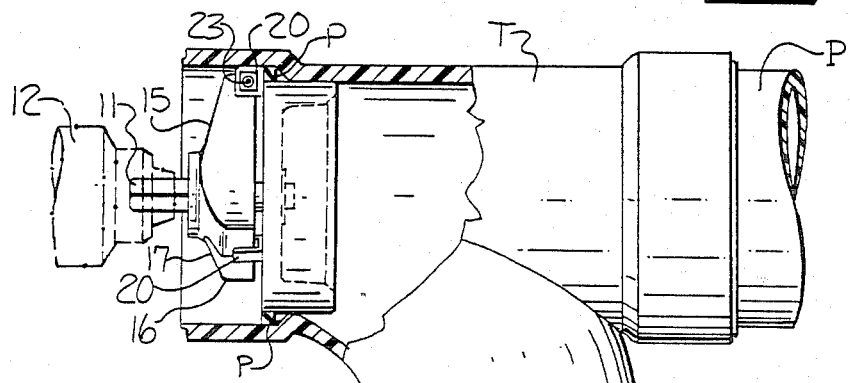
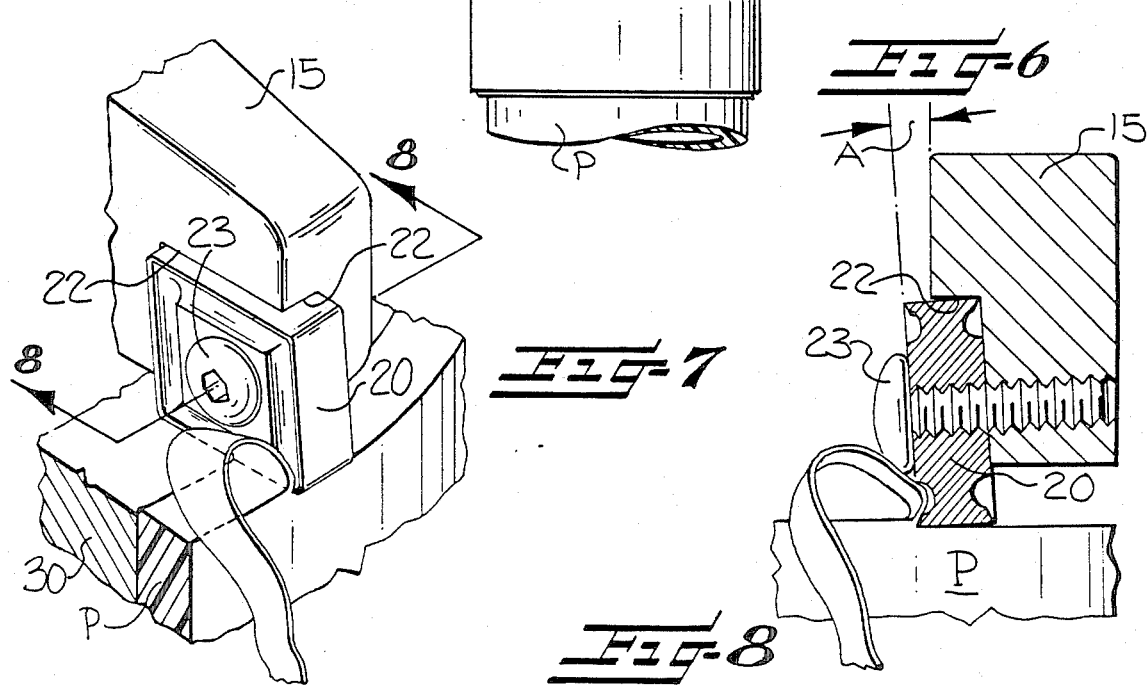

PLASTIC PIPE PLANING DEVICE

FIELD OF THE INVENTION

This invention relates to a device for progressively planing, shaving or cutting the end of a plastic pipe to the desired length, or for reaming out a piece of plastic pipe fixed in a plastic pipe fitting of the type used in plumbing systems and the like.

BACKGROUND OF THE INVENTION

In both commercial and residential construction, it is the usual practice to "rough-in" both the electrical and plumbing systems before the interior walls, floor and ceiling areas are finished. The plastic pipe sections are joined together by various types of plastic fittings with the pipe sections being "stubbed-in" so that their free ends extend inwardly a substantial distance beyond the interior surfaces of the walls, floor and/or ceiling. After the interior surfaces of the building are finished, it is the common practice to connect various types of fixtures to the exposed pipe ends. The installation of fixtures on the exposed pipe ends requires that the pipe end be cut in a precisely square manner to connect the fixture thereto.

In some instances, such as when installing urinals and the like flush against a wall, it is necessary to cut the pipe end substantially flush with the finished interior of the building. In many instances, the cutting of the pipe end is carried out by a hack or hand saw, a saw with a rotary blade, or a reciprocating saw and these methods do not insure the formation of a square and smooth cut on the end of the pipe. Also, it is difficult to use such methods to cut the pipe end flush with the interior of the building, and impossible to cut the end of the pipe inside of the finished interior surface of the building, without cutting away a portion of the interior surface surrounding the pipe to be cut.

Also, after the plastic pipe plumbing system has been completely installed, and during the pressure testing procedure, it sometimes happens that one or more leaking joints will be detected. It is then necessary to cut the pipe adjacent opposite sides of the defective or leaking joint and remove the fitting and adhesively connect other pipe sections to a new fitting to repair the leaking joint. The removed fitting and the pieces of pipe attached thereto are discarded and wasted. In order to eliminate discarding the fitting in a leaking joint, some plumbers cut the plastic pipe adjacent the fitting and then form a series of cuts around the section of plastic pipe inside of the fitting and use a small chisel to painstakingly remove the cut pieces of the pipe therefrom. However, in many instances this practice results in breaking or otherwise damaging the bell of the fitting to the extent that it is not possible to glue or weld a new pipe section into the fitting to provide a leak-free joint.

Others have recognized the inherent problems in cutting roughed-in pipes to precise lengths and repairing leaking joints, as carried out by the methods pointed out above. Various devices have been devised in an attempt to overcome these problems. For example, U.S. Pat. No. 4,466,185 discloses an adjustable pipe length cutter provided with rotating cutters which are maintained in position in the interior of the plastic pipe and are expanded as they are rotated so that the wall of the plastic pipe will be cut from the inside to the outside. Since the cutting operation takes place from the inside to the outside of the pipe, it is difficult to properly adjust the inner position of the expanding cutters to precisely cut the pipe to the desired length. Also, it is not possible to observe the cutting operation because it takes place on the interior of the pipe.

Devices have also been proposed for reaming out and removing plastic pipe sections from plastic pipe fittings. For example, U.S. Pat. No. 4,483,222 discloses a device which is adapted to be rotated by a drill or the like and which includes radially extending cutter blades with a complicated mechanism for imparting outward radial movement to the blades during rotation of the device for cutting away the pipe section from the inside of the pipe. The device of this patent also includes a nonrotating gripping device for retaining the pipe fitting in a fixed position while the cutting blades are rotating on the inside of the pipe section to remove the same therefrom.

U.S. Pat. No. 3,752,593, assigned to the same assignee as the present application, discloses a plastic pipe reamer having rotating cutting blades for engaging and cutting or shaving away the end of a pipe section positioned in a fitting. In this device a pilot member is supported for resilient inward movement on the inside of the bit supporting the cutter blades so that the pilot member may be forced to slide up into the bit member when removing a pipe section from an elbow-type fitting. The sliding pilot arrangement of the device of this patent may become inoperative if it is clogged with dirt, grit, plastic chips and the like during use, and will, therefore, be inoperative.

SUMMARY OF THE INVENTION

With the foregoing in mind, it is an object of the present invention to provide a plastic pipe planing device for progressively planing, shaving or cutting the end of a plastic pipe to the desired length while providing a smooth and flat cut end which is perpendicular to the longitudinal axis of the pipe, or for reaming out a piece of plastic pipe fixed in a plastic pipe fitting so that the plastic pipe can be replaced without damaging and disposing of the fitting.

The plastic pipe planing device of the present invention is of a simple and trouble-free construction and operates in a simple manner to either cut the plastic pipe to the desired length or to ream out the plastic pipe and repair a defective or leaking pipe joint. The present plastic pipe planing device includes a rotatable hub with a drive shaft having its inner end fixed to the hub and its outer end is adapted to be drivingly connected to a portable electric drill or the like for drivingly rotating the hub. Circumferentially spaced-apart spider-like cutter arms are fixed at their inner ends to the hub and extend radially outwardly therefrom with the outer ends terminating slightly inwardly of the outer diameter of the plastic pipe to be planed or reamed. A cutter blade is attached to the outer end portion of each of the cutter arms and includes a lower planing or cutting edge and an outer edge perpendicular to the cutting edge. The outer edge extends radially outwardly and is flush with the outer diameter of the plastic pipe. A cylindrical pilot member is removably supported on and rotatable with the hub and includes an outer circumference which is dimensioned to provide a snug rotatable fit within the end of the plastic pipe to be planed or reamed so that the hub and the cutter arms are maintained in a centered relationship relative to the plastic pipe.

Each of the cutter blades is provided with four cutting surfaces on each face thereof. Each cutter blade is removably attached to the corresponding cutter arm so that the cutter blade may be rotated when one cutting surface becomes dull to present a new cutting surface for engagement with the end of the plastic pipe. After all four cutting surfaces on one face of the cutter blade have been used, the cutter blade may be turned over and the four cutting surfaces on the rear face may be successively used to provide a long wear-life for the cutting blades.

The outer end portion of each of the cutter arms is provided with a recess or pocket for receiving and properly orientating the cutting blades at a negative rake angle relative to the direction of rotation of the planing device. The recess in the cutter arm aids in maintaining the cutting blade in the proper cutting position. The cylindrical pilot member is attached to the rotatable hub and the outwardly extending cutter arms in such a manner as to be easily removed therefrom when repairing defective joints in which a pipe section is fixed in an elbow fitting and the like.

As used herein, the term "plastic" pipe is intended to cover pipe and fittings formed of other types of polymeric materials, such as polyethylene, polyvinylchloride, hard rubber, or other elastomeric materials. Also, the present pipe planing device is manufactured in various sizes to accommodate the various sizes of plastic pipe and fittings currently being employed for plumbing, electrical and other mechanical systems installed in both commercial and residential buildings. While three radially spaced cutter blades are illustrated in the drawings, it is to be understood that the plastic pipe planing device could be provided with only two cutting blades, one on each side of the planing device, or could be provided with four or more radially spaced cutter arms and cutting blades.

The positioning of the cutting blades at a negative rake angle relative to the rotational direction of the planing device provides a smooth planing, shaving or cutting of the end of the plastic pipe and produces a substantially continuous ribbon of plastic material by each of the cutter blades. The negative rake positioning of the cutting blade prevents digging-in and gouging of the cutting blades and the formation of a ragged or jagged end on the plastic pipe. Rotation of the negative rake cutter blades against the end of the plastic pipe also causes friction which heats the pipe to a temperature to enhance the planing or shaving of the plastic pipe even when the planing device is operated in extremely cold temperatures.

The negative rake positioning of the cutter blades and the spaced-apart positioning of the cutter arms provides visual observation of the amount of plastic material being removed. The amount of plastic material being planed from the end of the plastic pipe can be controlled by varying the inward pressure being applied to the drill by the operator to either increase or decrease the amount of material being removed with each rotation of the cutter blades. The cylindrical pilot member aids in maintaining the cutter blades in position in the recesses formed in the cutter arms and keeps the planing device centered along the longitudinal axis of the plastic pipe. The circumferentially spaced-apart spider-like cutter arms provide sufficient space therebetween so that the ribbons of plastic material being removed by the cutter blades can easily escape and be directed outwardly of the pipe. The pilot member closes the end of the plastic pipe immediately adjacent the area where the planing, shaving or cutting operation takes place and prevents the cut-away plastic material from entering the end of the plastic pipe.

BRIEF DESCRIPTION OF THE DRAWINGS

Other objects and advantages will appear as the description proceeds when taken in connection with the accompanying drawings, in which—

FIG. 4 illustrates the present planing device being utilized during the initial stage of removal of a section of pipe from a plastic elbow, and showing a portion of the elbow in cross section;

FIG. 5 is a view similar to FIG. 4 but with the cylindrical pilot member being removed to permit the planing device to complete the second stage of removal of the pipe section;

FIG. 6 illustrates the present planing device being utilized to remove a pipe section from one section of a sweep-tee fitting;

FIG. 7 is a fragmentary perspective view showing the manner in which one of the cutter blades engages and planes, shaves or cuts a thin ribbon of plastic material from the end of the plastic pipe; and FIG. 8 is a vertical sectional view taken substantially along the line 8—8 in FIG. 7.

DESCRIPTION OF THE ILLUSTRATED EMBODIMENTS

Figure 1:
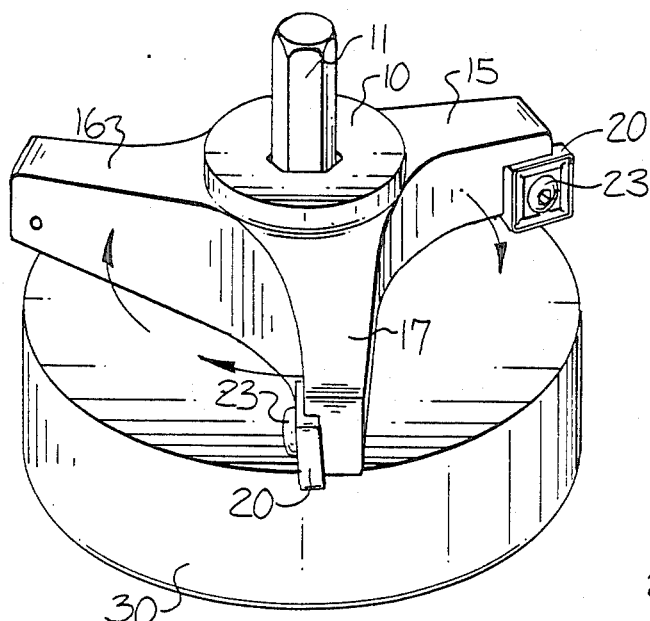
FIG. 1 is a perspective view of the present plastic pipe planing device.
Figure 2:
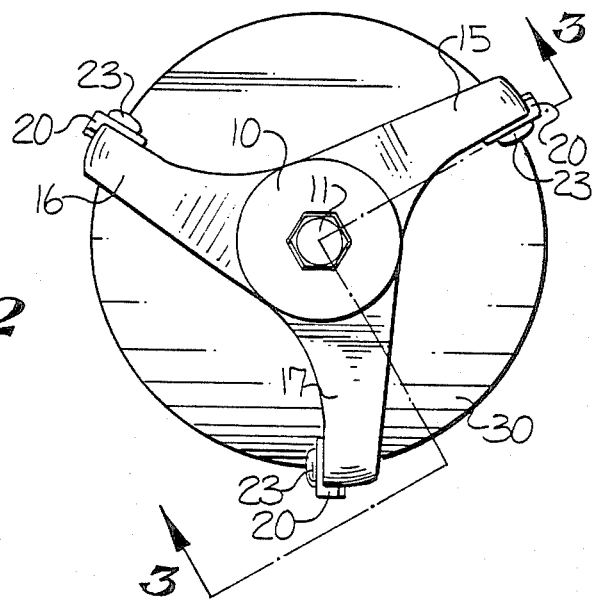
FIG. 2 is a top plan view looking downwardly on the upper surface of the planing device shown in FIG. 1.

As illustrated in FIG. 1, the present plastic pipe planing device includes a central rotatable hub portion 10 with elongate drive means, in the form of a hexagonal drive shaft 11, fixed thereto. The inner end of the hexagonal drive shaft 11 is pressed into a hexagonal hole in the hub 10 to prevent relative rotation between the drive shaft 11 and the hub 10. The outer end portion of the drive shaft 11 is adapted to be drivingly connected to the chuck of a portable electric drill, indicated in dash-dot lines at 12 in FIGS. 3–6.

Figure 3:
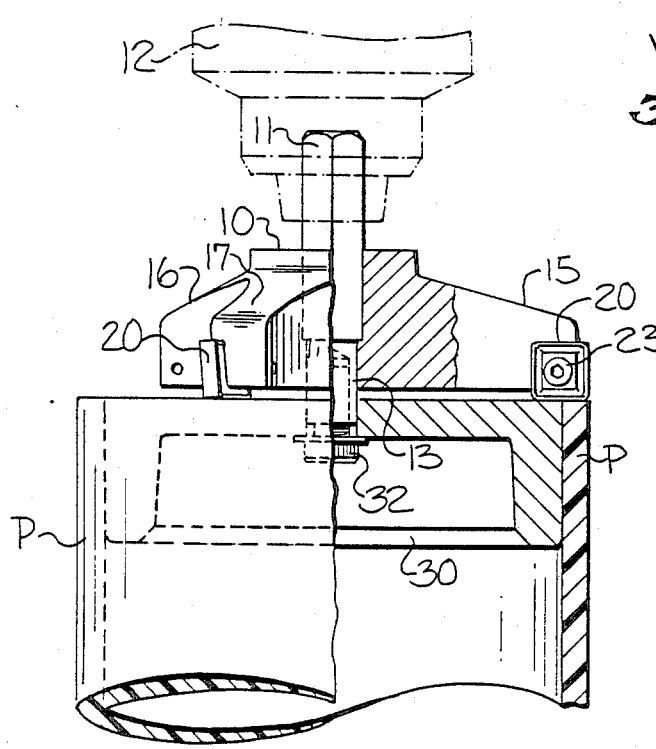
FIG. 3 is an elevational view of the planing device positioned in one end of a plastic pipe, being taken substantially along the line 3—3 in FIG. 2, with the right-hand portion being shown in cross section and the left-hand portion in elevation.

As illustrated in FIG. 3, the inner end portion of the drive shaft 11 is provided with an extension 13 of reduced diameter and which is round in cross section. The extension 13 penetrates a pilot hole in the lower portion of the hub 10, for purposes to be presently described. circumferentially spaced-apart spider-like cutter arms 15, 16 and 17 have their inner ends fixed to the hub 12 and extend outwardly therefrom. It is preferred that the cutter arms 15–17 and the hub 11 be integrally cast together to provide relatively wide open spaces between the radially spaced cutter arms. As illustrated in FIG. 3, it is preferred that the outer ends of each of the cutter arms 15–17 terminate slightly inwardly of the outer diameter of the plastic pipe to be planed, indicated at P.

A cutter blade 20 is removably attached to the outer end portion of each of the cutter arms 15–17 and includes a lower planing or cutting edge and an outer edge which is perpendicular to the cutting edge. The outer edge of the cutter blade 20 is flush with the outer diameter of the plastic pipe P to be planed (FIG. 3) and the inner edge of the cutter blade 20 is positioned inwardly of the inner diameter of the pipe to be planed.

As best illustrated in FIGS. 7 and 8, each cutting face of each of the cutter blades 20 is square and is removably attached to a blade receiving seat or recess 22 formed in the outer end portion of the corresponding cutter arms 15-17 by means of a threaded bolt 23 which is provided with a hexagonal opening for engagement by an Allen wrench or the like. The end portion of the bolt 23 passes through a central hole in the cutter blade 20 and is threadably supported in a threaded bore in the outer end of the cutter arm. The face of the recess 22 against which the cutter blade 20 is supported is disposed at an angle of approximately 5 degrees in a forward rake position, as indicated by the reference A and the dash-dot lines in FIG. 8. Each of the four side edges of opposite faces of the cutter blade 20 is provided with cutting edges so that when one cutting surface becomes dull, the cutter blade can be rotated one-quarter turn to present a sharp cutting edge for planing, shaving or cutting the plastic pipe P. After all four cutting surfaces on one face of the cutter blade are dull, the cutting blade can be removed and reversed to present the other face to the outer position and provide four additional sharp cutting edges.

Pilot means, in the form of a hollow cylindrical member 30, is carried by and rotatable with the hub 10 and is supported for easy removal from the hub 10. As illustrated in FIG. 3, the cylindrical pilot member 30 is removably supported on the hub 10 and beneath the cutter arms 15-17 by means of a bolt 32 which has its upper end threadably supported in a threaded bore in the extension 13 of the drive shaft 11. The outer circumference of the pilot 30 is dimensioned to provide a snug rotatable fit within the inside of the plastic pipe P to be planed. The pilot 30 operates to guide and center the hub 10, the cutter arms 15-17, and the cutting blades 20 along the longitudinal axis of the plastic pipe P and to thereby maintain the outer edges of the cutter blades 20 flush with the outer diameter of the plastic pipe P.

The plastic pipe planing device of the present invention is illustrated in FIG. 3 in the position it occupies when being used to cut a plastic pipe P to the desired length. In this position, the planing device may be used to cut a stubbed-in plastic pipe to a length which is flush with a wall, floor or ceiling, may be used to cut the length of the plastic pipe to any desired length spaced from the building structure, or may be used to cut the plastic pipe to a length which is positioned inwardly of a finished wall, floor or ceiling for mounting certain types of fixtures thereon.

In FIGS. 4 and 5, the plastic pipe planing device of the present invention is illustrated in the position it occupies when being used to ream out a piece of plastic pipe which is fixed in a plastic pipe elbow to repair a defective joint therebetween. In this type of operation, the plastic pipe is transversely cut by any suitable means, such as a saw, at a location adjacent the defective joint. The present plastic pipe planing device is then positioned in the end of the piece of pipe to be reamed out and rotated to cut away the end of the plastic pipe down to a position within the hub of the plastic elbow E, as illustrated in FIG. 4. When the outermost portion of the plastic pipe P is reamed out, the cutting blades 20 are positioned within the hub of the elbow E, and the inner end portion of the pilot 30 engages the inwardly curved portion of the interior of the elbow E and prevents further inward movement of the planing device. The operator then withdraws the planing device and simply unscrews the bolt 32 and removes the pilot 30, and then reinserts the planing device into the hub of the elbow E, as illustrated in FIG. 5. The planing device is again rotated to continue the reaming-out operation and remove the remaining portion of plastic pipe P, as illustrated in FIG. 5. During this second stage of the reaming-out operation, the planing device is guided by the inner surface of the hub of the elbow E so that it remains centered during the removal of the remaining part of the plastic pipe P. After the piece of plastic pipe has been reamed out, adhesive or solvent is applied to another pipe section and inserted into the hub of the elbow E.

The present planing device may also be used in repairing a defective joint between a plastic pipe and other types of fixtures or connectors, such as the sweep-tee illustrated at T in FIG. 6. When removing a piece of pipe P from one of the bells on the straight end of the tee T, as illustrated in FIG. 6, it is not necessary to remove the pilot 30, as is the case when repairing a defective joint in an elbow, as previously described, since there is no obstruction in the tee T to prevent inward movement of the pilot P.

As best illustrated in FIGS. 7 and 8, the cutter blade 20 is positioned in the recess or pocket 22 at a negative rake angle relative to the direction of rotation of the planing device so that the end of the plastic pipe is planed, shaved or cut in such a manner that a substantially continuous thin strip or ribbon of the plastic material is removed by the rotating cutting blade 20. When the bolt 32 is tightened to attach the pilot 30 to the hub 10, the upper surface of the pilot 30 engages the inner portions of the lower edges of the cutter blades 20 to help maintain the cutting blades in the recess 22. As has been mentioned, the rotation of the cutter blades 20 on the upper or free end of the pipe P creates friction and generates heat so that even cold pipe is heated to a sufficient temperature that the end of the pipe can be smoothly cut by the blades 20 without gouging and digging into the pipe P.

While the description of the removal of the material from the end of the plastic pipe is herein described as planing, shaving, reaming or cutting, it is to be understood that each of these terms is used to describe the same type of removal of plastic material from the end of the pipe by the cutting blades 20. The supporting of the cutting blades 20 on the outer ends of the spaced-apart spider-like cutter arms 15-17 provides sufficient clearance between the cutter arms that the ribbons or shavings of plastic material removed from the pipe are directed to the outside of the pipe P where they are easily removed and discarded. The wide spacing of the cutter arms 15-17 also provides visual access to the operator to clearly observe the amount of plastic material being cut away.

In addition to being useful to cut pipe to a predetermined length and repair leaking joints, the present planing device can also be used to remove or ream out a pipe section from a fitting which is positioned at an improper angle. This situation occurs in many instances when roughing-in a plumbing system because the solvent or adhesive used to join the pipe and the fitting forms a permanent set or weld within approximately thirty to sixty seconds after the pipe is inserted into the fitting. If the fitting is not initially set on the pipe at the proper angle, it is impossible to change the angular position of the fitting on the pipe after the adhesive is set. This type of mistake can be easily remedied by using the present planing device to ream the plastic pipe section from the fitting and reposition the fitting on the plastic pipe at the correct angle.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A plastic pipe planing device for progressively planing or cutting the end of a plastic pipe, and for reaming out a piece of plastic pipe fixed in a plastic pipe fitting, said planing apparatus comprising a rotatable hub, elongate drive means having an inner end fixed to said hub, and an outer end adapted to be drivingly connected to a portable electric drill for drivingly rotating said hub, circumferentially spaced-apart spider-like cutter arms having inner ends fixed to said hub and extending radially outwardly therefrom, and outer ends terminating slightly radially inwardly of the outer diameter of the plastic pipe to be planed, a cutter blade attached to the radial outer end portion of each of said cutter arms and including a lower planing or cutting edge and a radial outer edge perpendicular to said cutting edge, said radial outer edge extending radially outwardly and being flush with the outer diameter of the plastic pipe to be planed, and a cylindrical pilot removably carried by and rotatable with said hub, said pilot including an outer circumference dimensioned to provide a snug rotatable fit within the end of the plastic pipe to be planed, and for centering said hub and said cutter arms relative to the plastic pipe, said cylindrical pilot including an upper planar surface engaging said lower cutting edges of said cutter blades.

2. A plastic pipe planing device according to claim 1 wherein said elongate drive means comprises a drive shaft having a hexagonal cross section, and wherein said hub includes a hexagonal hole into which said hexagonal drive shaft is fitted.

3. A plastic pipe planing device according to claim 1 wherein three of said cutter arms are fixed to and extend radially outwardly from said rotatable hub.

4. A plastic pipe planing device according to claim 1 wherein each of said cutter blades includes a square cutting face, and a cutting edge is provided on each of the four sides thereof.

5. A plastic pipe planing device according to claim 1 including a bolt penetrating said cylindrical pilot and being threaded into said rotatable hub to maintain said cylindrical pilot in position on said planing device.

6. A plastic pipe planing device according to claim 1 wherein each of said cutter blades is supported on said cutter arms at a negative rake angle relative to the rotational direction of said planing device.

7. A plastic pipe planing device according to claim 1 including a cutter blade receiving recess in the outer end portion of each of said cutter arms for receiving upper and inner portions of said cutter blades therein.

8. A plastic pipe planing device according to claim 7 wherein said cutter blade recess maintains said cutter blade at a negative rake angle relative to the rotational direction of said planing device.

9. A plastic pipe planing device according to claim 8 including a bolt extending through said cutter blade and being threaded into said cutter arms to removably maintain said cutter blade in said cutter blade recess.

* * * * *